United States Patent [19]
Ellis

[11] Patent Number: 6,035,900
[45] Date of Patent: Mar. 14, 2000

[54] VACUUM HOSE

[76] Inventor: Harrell P. Ellis, 5133 Northeast Pkwy., Fort Worth, Tex. 76106

[21] Appl. No.: 09/003,528

[22] Filed: Jan. 6, 1998

[51] Int. Cl.$^7$ .................................................... B32B 35/00
[52] U.S. Cl. .......................... 138/174; 138/172; 138/153; 138/177; 138/114
[58] Field of Search ................... 138/177, 172, 138/174, 114, 113, 112, 153

[56] References Cited

U.S. PATENT DOCUMENTS

| | | | |
|---|---|---|---|
| 2,458,686 | 1/1949 | Davie, Jr. | 138/172 X |
| 2,624,366 | 1/1953 | Pugh | 138/114 X |
| 2,674,857 | 4/1954 | Fortes | 138/172 X |
| 3,860,040 | 1/1975 | Sullivan | 138/124 |
| 4,410,012 | 10/1983 | Redding et al. | 138/172 X |
| 5,001,305 | 3/1991 | Bartholomew | 138/174 X |
| 5,048,572 | 9/1991 | Levine | 138/121 |
| 5,097,870 | 3/1992 | Williams | 138/174 X |
| 5,285,008 | 2/1994 | Sas-Jaworsky et al. | 138/174 X |
| 5,437,311 | 8/1995 | Reynolds | 138/177 X |
| 5,573,040 | 11/1996 | Schumacher et al. | 138/172 X |

*Primary Examiner*—Patrick Brinson
*Attorney, Agent, or Firm*—Jerry C. Ray

[57] ABSTRACT

An improved vacuum hose includes an axial vacuum conduit having outer linear buttresses integral with the conduit and arranged radially around the conduit; the buttresses are strengthened by substantially orthogonal ribs. Buttresses and ribs are imbedded in a matrix of flexible plastic which provides support and increases the collapse resistance of the conduit; the whole assembly is covered by a tough casing which may be a separate component or a treated surface of the matrix material.

12 Claims, 2 Drawing Sheets

VACUUM HOSE

CROSS REFERENCE TO RELATED APPLICATIONS

None.

BACKGROUND OF THE INVENTION

1. Field of the Invention

This invention relates to hoses and flexible lines for vacuum distribution, and specifically to such hoses having a vacuum conduit strengthened by integral buttresses imbedded in a plastic matrix and sheathed in a casing.

2. Description of the Related Art

Vacuum technology has applications in all processes carried out at less than normal atmospheric pressure. Industrial applications of vacuum technology range from manipulation of objects by use of suction cups to the deposition of integrated electronic circuits on silicon chips. Research laboratories, including medical research facilities, also make wide-spread use of vacuum technology. Electron microscopes and mass spectrometers are examples of research equipment requiring vacuum for their operation. Pumps of various designs and principles of operation provide the vacuum required for each application. Most applications, of course, require a conduit connecting the pump and the chamber or equipment to be evacuated; in many applications the conduit is a hose or other flexible line.

Hoses and other lines for vacuum distribution must of course be collapse-resistant. Various types of hose wall construction and different types of materials are used to furnish the strength necessary to avoid collapse. Making the walls stronger, however, generally reduces flexibility; flexibility is advantageous in many applications and necessary in some. The problem addressed by the present invention is how to make a hose for vacuum distribution which is both flexible and collapse-resistant.

SUMMARY OF THE INVENTION

The present invention provides an improved hose for vacuum distribution. A central, axial tube or conduit is braced against collapse by an arrangement of external buttresses. Spaced around the tube's exterior, the buttresses extend the length of the tube. A bar or rib extends across the top of each buttress strip; the space between and around the buttresses is filled with a pliable material. Covering the assembly is a tough, resistant casing. Extruded together with the tube, the ribbed buttresses are supported by the resilient matrix which surrounds them; this support enables the buttresses to hold the tube wall against the pull exerted by a vacuum contained within the tube. This arrangement allows the tube to have thinner walls with a resultant increase in flexibility.

Based on the above, it is an object of this invention to provide an improved flexible hose for vacuum distribution.

It is a further object of this invention to provide a vacuum distribution hose which is superior in performance to other hoses used for the same purpose.

Another object is to provide a vacuum distribution hose which may be economically produced by extrusion.

Further objects are to achieve the above with a device that is sturdy, compact, lightweight, safe, and reliable, yet inexpensive and easy to manufacture, install, and maintain.

The specific nature of the invention, as well as other objects, uses, and advantages thereof, will clearly appear from the following description and from the accompanying drawings, the different views of which are not necessarily scale drawings.

CATALOG OF THE ELEMENTS

Figure 1:
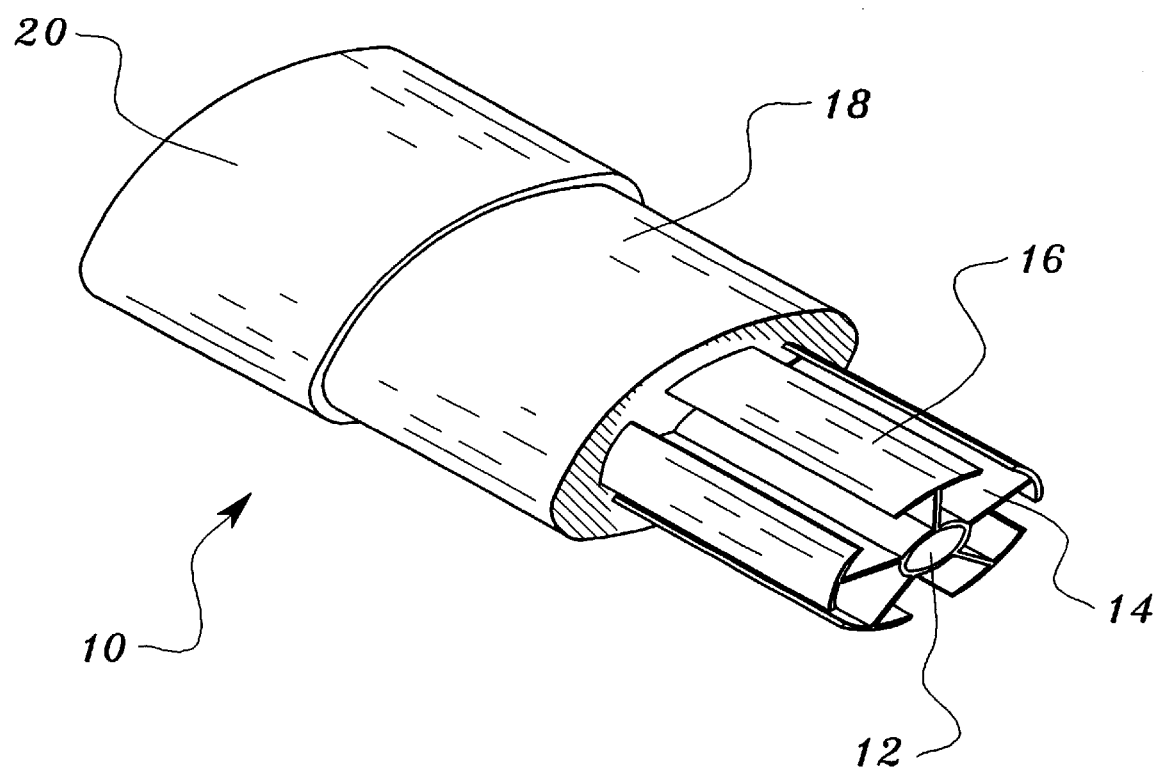
FIG. 1 is a cutaway perspective showing the various components of the vacuum hose.

To aid in the correlation of the elements of the invention to the exemplary drawings, the following catalog of the elements is provided:

10 hose
12 axial tube
14 buttress
16 rib
18 matrix
20 casing

DESCRIPTION OF THE PREFERRED EMBODIMENT

Referring to the drawings, FIG. 1 shows a cutaway of the vacuum distribution hose 10. A central tube 12, which is the conduit for the vacuum, is made from Teflon® or another suitable fluoropolymer. Because the preferred method of manufacture is extrusion, the tube material must be extrudable as well as flexible.

Figure 2:
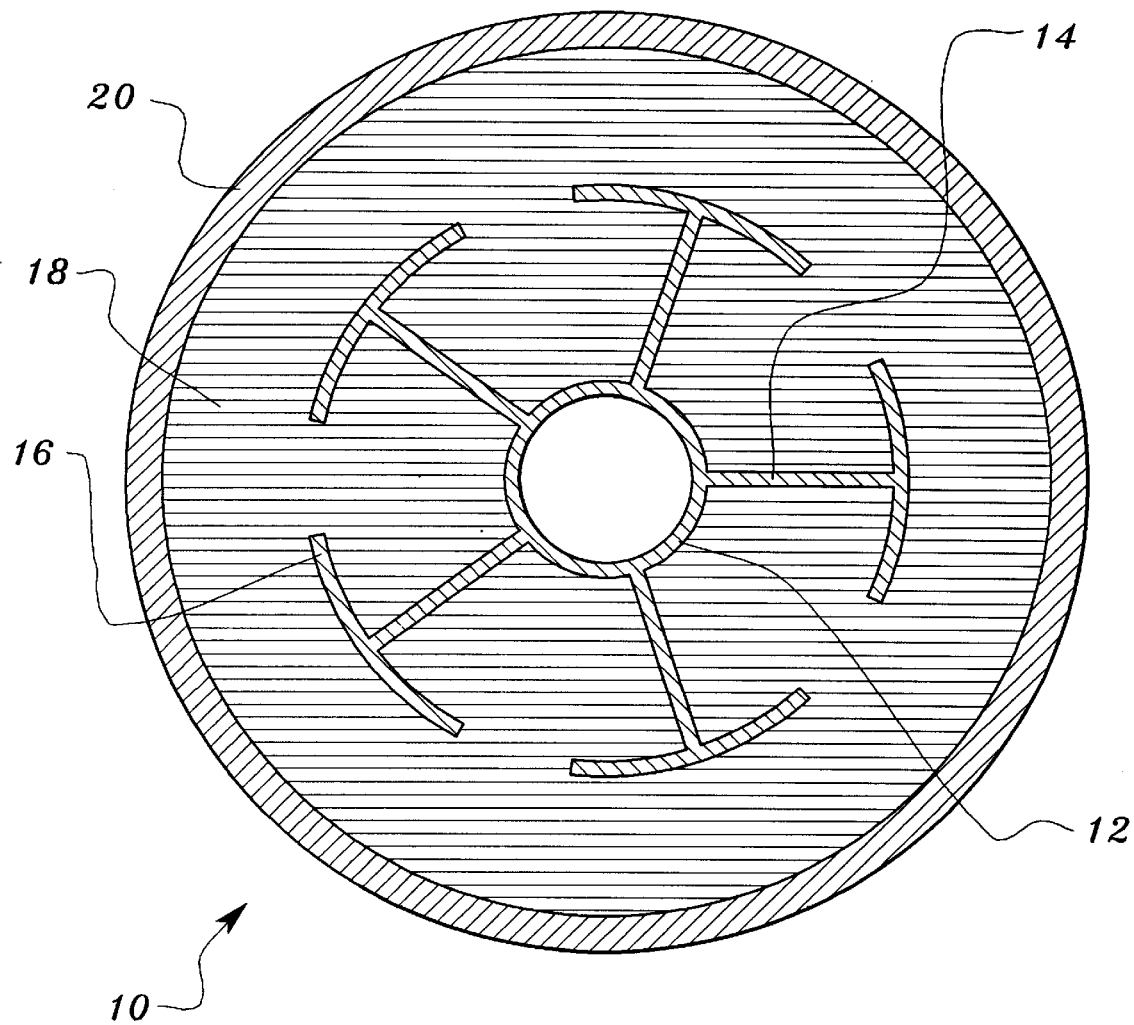
FIG. 2 is an end view of the hose, illustrating the relationship of the buttresses to the tube.

As will be seen from the cross section of the hose shown in FIG. 2, buttresses 14 are integral with the central tube 12. In the preferred embodiment the cent tube and buttresses are extruded together, through a single die. As described below, the buttresses increase the collapse resistance of the central tube.

Referring to FIGS. 1 and 2, the buttresses 14 are linear walls which extend the length of tube 12. The buttresses extend radially from the tube; their number is variable, being a function of the tube's diameter and the quality of vacuum to which the tube is subjected. Larger diameter tubes and/or stronger vacuums require a larger number of buttresses. The radial width of the buttresses 14 is comparable to a diameter of the tube 12; where increased flexibility is desired, the buttresses are narrower.

The buttresses 14 are wider at their outer portion than at their inner portion where the buttresses join the central tube. In one embodiment (shown), each buttress includes a cross piece, herein called a rib 16, resulting in a substantially T-shaped cross section. This configuration provides maximum support of the buttresses by the matrix 18. That is, the arms of the "T" provide a greater area to be supported by the matrix, so that stress imparted to a buttres 14 from tube 12 is transmitteed to a rib 16, and thence to the matrix 18. Because the ribs are arcuate to conform to the circular cross section of the hose, the arms of each "T" shape curve toward the central tube 12. Rib 16 may extend to one side only of the buttress, so that in cross section the buttress/rib assembly is shaped like an inverted "L." Another embodiment (not shown) includes buttresses which are triangular in cross section, with one apex of the triangle joined to the tube and the wider base of the triangle oriented outward, away from the tube. In still another embodiment, the ribs 16 are angled toward the tube so that the ribs form an acute angle with the primary buttress.

Generally, the buttresses 14 are made of the same material as the tube 12, and are preferably extruded together with the tube. Where a specific application requires different characteristics for the buttresses such as greater flexibility or toughness, the buttresses may be of a different material. Any buttress material, however, must be bondable (under temperatures and pressures used in the extrusion process) to the fluoropolymer used in the central tube. Flexibility is a common characteristic of buttresses and tube, so that the completed hose assembly remains flexible.

Matrix 18 is a pliable plastic which fills the space between the central tube 12 and outer sheath or casing 20. Matrix 18 is preferably extruded around the central tube and its buttresses in a secondary extrusion operation. The matrix may extend beyond the buttress ribs as shown, or the matrix and ribs may be conterminous. Silicone, polyurethane, or other similar materials are suitable for the matrix; the material used must be flowable at the temperatures and pressures used in the extrusion process. As the wall of the central tube is stressed by the contained vacuum, part of the stress is transmitted through the buttresses 14 and ribs 16 to the matrix 18. Embedded in and supported by matrix 18, the buttresses in turn support the central tube so that it resists collapsing. Achieving the same degree of vacuum resistance using a mono-walled hose would require a hose having a much heavier and thicker wall.

Providing protection and abrasion resistance for the hose, casing 20 forms a sheath around the matrix material. The casing 20 may be of braided material or a solid sheath; preferably the casing is resistant to lubricants, solvents, and other hazards of the workplace. The casing is pliable, as are the other components of the vacuum hose. In the alternative, the outer surface material of matrix 18 may be treated by thermal or by chemical means to form a tough, protective outer layer so that a separate casing is not required.

The restrictive description and drawing of the specific examples above do not point out what an infringement of this patent would be, but are to enable one skilled in the art to make and use the invention. Various modifications can be made in the construction, material, arrangement, and operation, and still be within the scope of my invention. The limits of the invention and the bounds of the patent protection are measured by and defined in the following claims.

I claim as my invention:

1. A hose for vacuum distribution, comprising:
   a collapse-resistant axial tube,
   at least one linear buttress integral with said tube, said buttress being continuous alone a length of said axial tube, and
   a matrix surrounding and supporting said buttress, so that said buttress prevents said tube from collapsing when an interior of said tube is evacuated.

2. The invention as described in claim 1, further comprising:
   said buttress having an outer portion and an inner portion, said inner portion joined to said tube, and
   a cross section of said buttress being relatively wider at its outer portion than at its inner portion.

3. The invention as described in claim 2, further comprising:
   a rib integral with said outer portion of said buttress.

4. The invention as described in claim 3, wherein a cross section of said buttress is substantially T-shaped.

5. The invention as described in claim 1, further comprising:
   a casing enclosing an assembly of said tube and said matrix.

6. A hose for vacuum distribution, comprising:
   a collapse-resistant axial tube of flexible plastic,
   two or more flexible linear buttresses integral with said tube, said buttresses being continuous along a length of said axial tube, and
   a flexible matrix surrounding and supporting said buttresses, so that said buttresses prevent said tube from collapsing when an interior of said tube is evacuated.

7. The invention as described in claim 6, further comprising:
   said flexible linear buttresses having an outer portion and an inner portion, said inner portion joined to said tube, and
   a cross section of said buttresses being relatively wider at its outer portion than at its inner portion.

8. The invention as described in claim 7, further comprising:
   a rib integral with said outer portion of said buttress, said rib being substantially orthogonal to said buttress.

9. The invention as described in claim 6, wherein a cross section of said buttress is substantially T-shaped.

10. The invention as described in claim 6, further comprising:
    a casing enclosing an assembly including said tube and said matrix.

11. A method of conducting vacuum between a vacuum source and a device to be evacuated, comprising the following steps:
    extruding a flexible conduit having two or more integral linear buttresses,
    filling a space between said buttresses with a flexible matrix so that said buttresses are embedded in and supported by said matrix,
    attaching a first end of said conduit to a vacuum source, and
    attaching a second end of said conduit to a device to be evacuated.

12. The method as described in claim 11, further comprising the following steps:
    applying a protective sheath to a hose assembly including said flexible conduit and said flexible matrix.

* * * * *